United States Patent
Zeng et al.

(10) Patent No.: US 8,670,213 B1
(45) Date of Patent: Mar. 11, 2014

(54) METHODS FOR TUNABLE PLATING SEED STEP COVERAGE

(75) Inventors: Wanxue Zeng, Pleasanton, CA (US); Weimin Si, San Ramon, CA (US); Ying Hong, Los Gatos, CA (US); Zhigang Bai, Milpitas, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/422,997

(22) Filed: Mar. 16, 2012

(51) Int. Cl.
  *G11B 5/23* (2006.01)
  *B44C 1/22* (2006.01)
(52) U.S. Cl.
  USPC .......................................... 360/125.3; 216/22
(58) Field of Classification Search
  USPC ......... 360/125.12, 125.16, 125.3; 216/22, 66, 216/74, 89, 96
  See application file for complete search history.

(56) References Cited

U.S. PATENT DOCUMENTS

| | | | |
|---|---|---|---|
| 6,954,340 B2 | 10/2005 | Shukh et al. | |
| 7,362,543 B2 * | 4/2008 | Hsiao et al. | 360/123.01 |
| 7,444,740 B1 | 11/2008 | Chung et al. | |
| 7,646,568 B2 | 1/2010 | Zhang et al. | |
| 7,773,341 B2 | 8/2010 | Zhang et al. | |
| 8,231,796 B1 * | 7/2012 | Li et al. | 216/22 |
| 8,262,918 B1 * | 9/2012 | Li et al. | 216/22 |
| 8,277,669 B1 * | 10/2012 | Chen et al. | 216/22 |
| 2005/0184288 A1 * | 8/2005 | Bao et al. | 257/40 |
| 2006/0019487 A1 * | 1/2006 | Leuschner et al. | 438/637 |
| 2007/0059502 A1 | 3/2007 | Wang et al. | |
| 2009/0279206 A1 | 11/2009 | Yang et al. | |
| 2011/0042349 A1 | 2/2011 | Zhou et al. | |
| 2012/0111826 A1 * | 5/2012 | Chen et al. | 216/22 |

OTHER PUBLICATIONS

U.S. Appl. No. 12/943,835, filed Nov. 10, 2010, 21 pages.

* cited by examiner

*Primary Examiner* — Angel Castro

(57) ABSTRACT

A writer main pole for a perpendicular magnetic recording system is provided. The writer pole has a tunable bottom gap to side gap ratio, and may be formed using deposition of a first seed layer through an ion beam deposition process, deposition of a second seed layer through a physical vapor deposition process, and deposition of a non-magnetic gap layer through a chemical vapor deposition process.

13 Claims, 5 Drawing Sheets

US 8,670,213 B1

METHODS FOR TUNABLE PLATING SEED STEP COVERAGE

TECHNICAL FIELD

This invention relates to the field of perpendicular magnetic recording (PMR) technology and more specifically, to manufacture of PMR write heads.

BACKGROUND

Perpendicular magnetic recording (PMR) writer main poles are conventionally formed in trenches of non-magnetic or insulating materials. The PMR writer main pole is a trapezoidal formation of magnetic material deposited in a trapezoidal trench etched in a surrounding material. Before deposition of the magnetic material, the trench is plated in a seed layer of non-magnetic material. The plating seed provides a void-free fill of the trench with the magnetic material while retaining desirable properties such as high saturation magnetization, low easy/hard axis coercivity, low anisotropy, high frequency response, and low remnant magnetization.

In some cases, the writer main pole may be encapsulated with a soft magnetic shield layer. In this application, a plating seed layer in the trench is also used. In both applications, Ru is conventionally used as the plating seed layer. Conventionally, atomic layer deposition (ALD) and conformal chemical vapor deposition (CVD) are the only commercially viable methods to provide conformal Ru deposition.

In one conventional process, an $RuO_4$-containing mixture is used as the Ru precursor and $H_2$ as the co-reactant of $RuO_4$ to deposit a highly conductive and continuous Ru film. However, the step coverage of the CVD Ru process alone is poor because field, trench sidewall, and trench bottom are usually different materials. Conventionally, a seed layer is deposited between the trench and the CVD Ru layer using a physical vapor deposition (PVD) process. Even with this combination, the bottom gap is thinner than the side gap because of re-deposition and sputtering during pre-cleaning etching. For example, the conventional process typically results in less a bottom gap to side gap (BG/SG) ratio of less than 88%. It is expected that the writer field (Hv) will decrease significantly as the bottom gap (also known as the leading gap (LG)) decreases from 60 nm to 40 nm. Accordingly, with increasing miniaturization the decreased thickness of the bottom gap will increasingly degrade writeability.

BRIEF DESCRIPTION OF THE DRAWINGS

The present invention is illustrated by way of example, and not limitation, in the figures of the accompanying drawings in which.

DETAILED DESCRIPTION

In the following description, numerous specific details are set forth, such as examples of specific layer compositions and properties, to provide a thorough understanding of various embodiment of the present invention. It will be apparent however, to one skilled in the art that these specific details need not be employed to practice various embodiments of the present invention. In other instances, well known components or methods have not been described in detail to avoid unnecessarily obscuring various embodiments of the present invention.

The terms "over," "under," "between," and "on" as used herein refer to a relative position of one media layer with respect to other layers. As such, for example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in contact with that second layer. Additionally, the relative position of one layer with respect to other layers is provided assuming operations are performed relative to a substrate without consideration of the absolute orientation of the substrate.

Figure 1A:
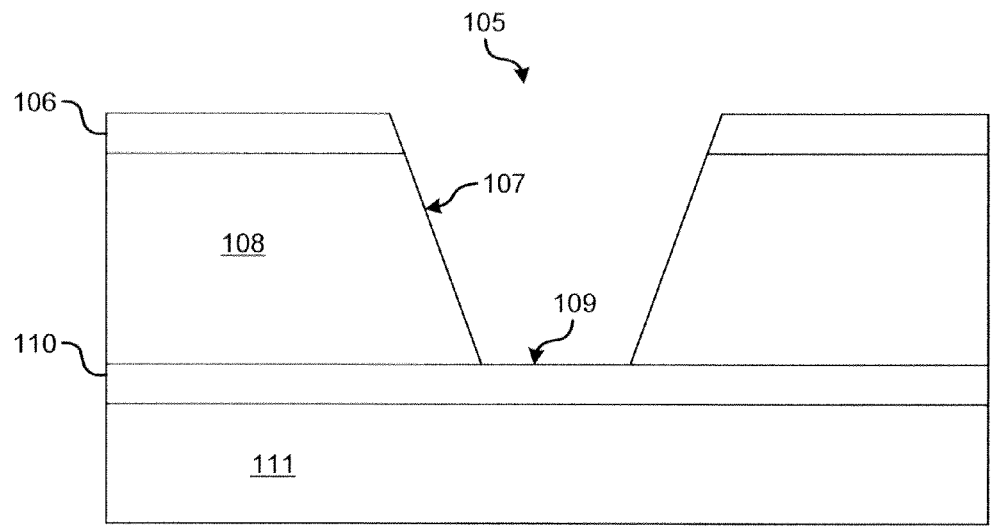
FIG. 1A is a diagram illustrating a trench for a PMR writer main pole.
Figure 1B:
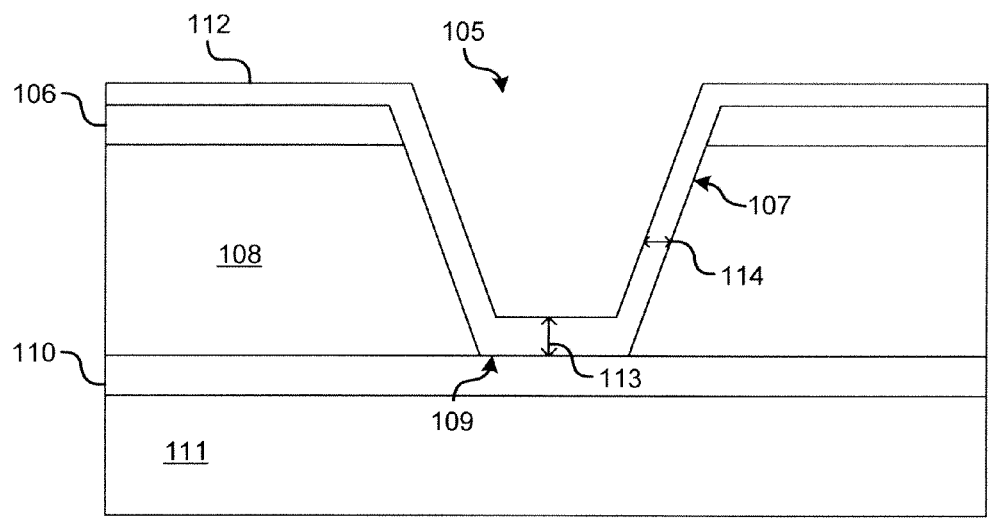
FIG. 1B is a diagram illustrating the trench after deposition of a first seed layer using an ion beam deposition (IBD) process.
Figure 1C:
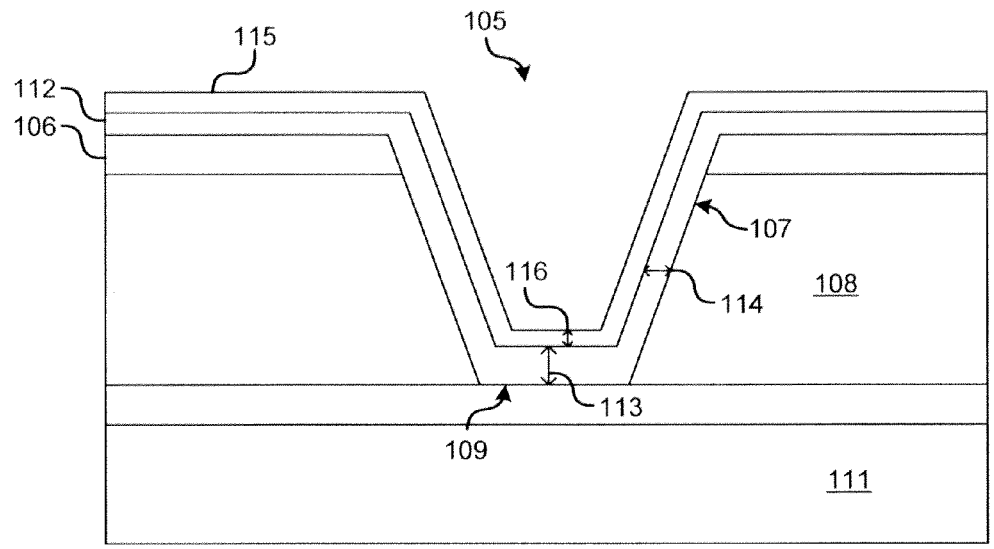
FIG. 1C is a diagram illustrating the trench after deposition of a second seed layer using a PVD process.
Figure 1D:
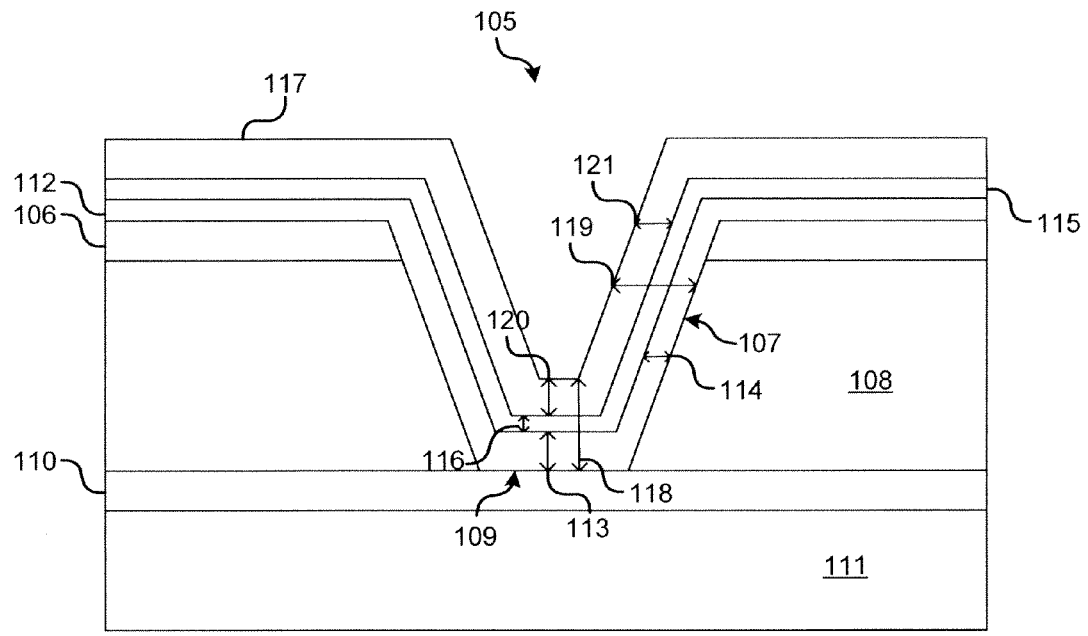
FIG. 1D is a diagram illustrating the trench after deposition of a non-magnetic gap layer using a CVD process.
Figure 1E:
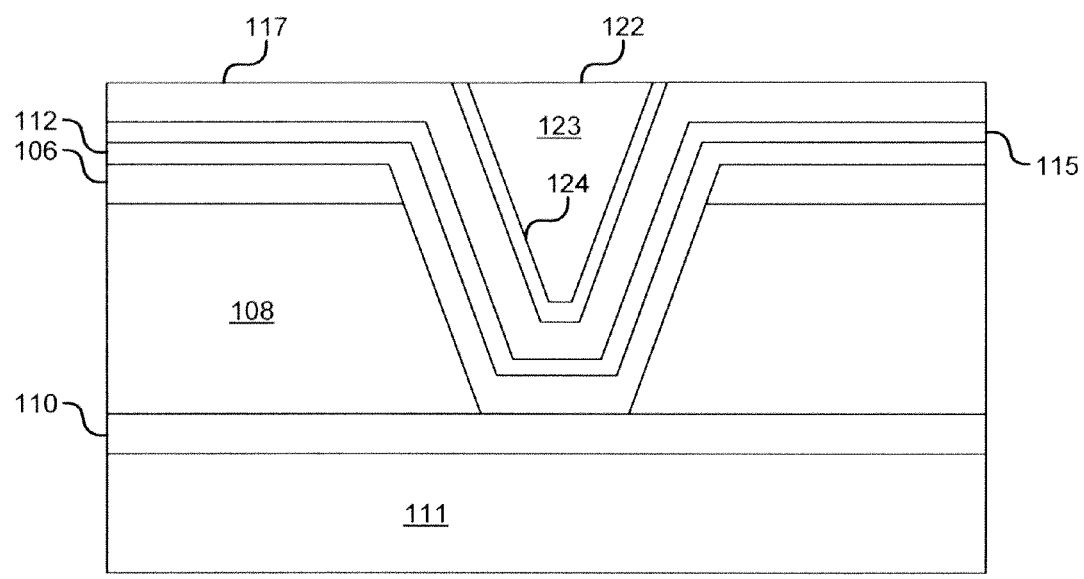
FIG. 1E is a diagram illustrating the plated trench after being filled with the PMR writer main pole.
Figure 2:
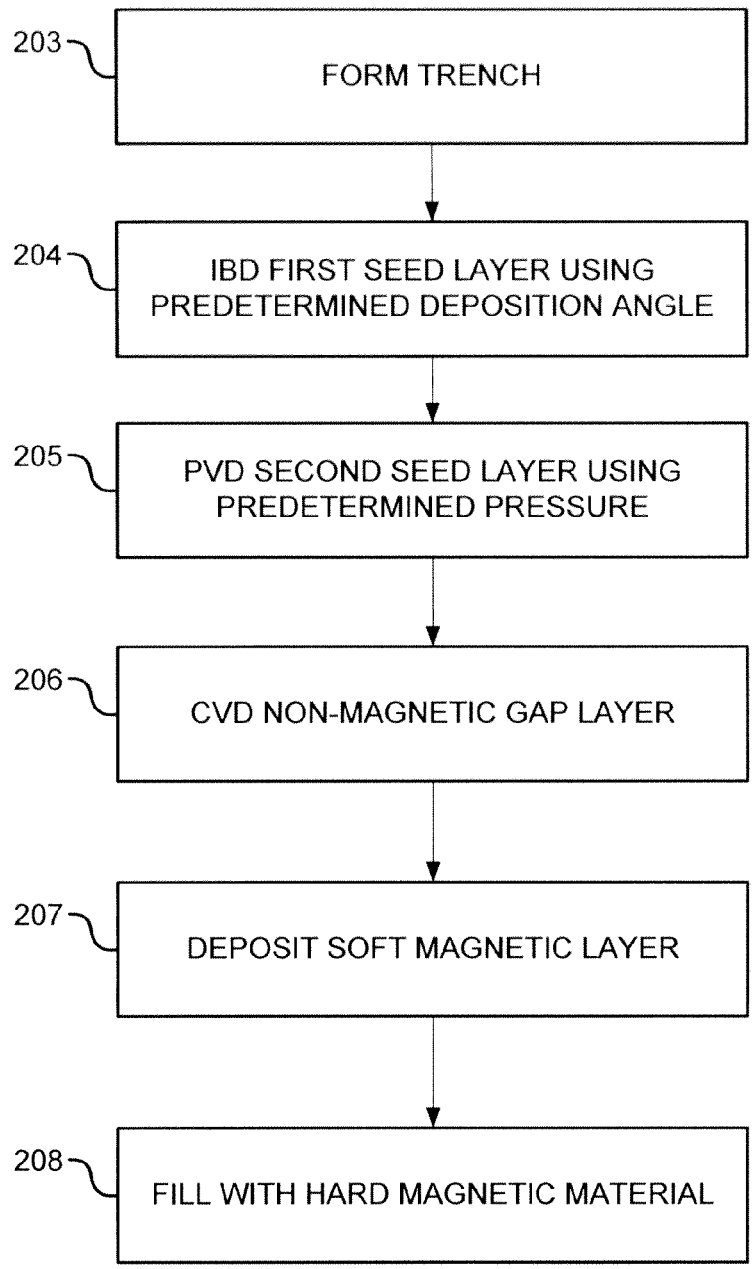
FIG. 2 is a flowchart describing a process used for manufacturing a PMR writer main pole.

FIGS. 1 and 2 illustrate a process for creating a non-magnetic gap layer for a PMR writer main pole having a tunable BG/SG ratio. Implementations of this process allow the BG/SG ratio of the non-magnetic gap layer to be selected between 90% and 120%. This in turn decreases flux leakage in the resulting PMR main pole and improves writeability.

FIGS. 1A-1E illustrate the device after various process steps and will be described in conjunction with FIG. 2, which details the process steps themselves.

In a first step, 203, a trench 105 is formed in a layer 108 deposited over a substrate (110 & 111). The trench 105 is illustrated in FIG. 1A. In some embodiments, the substrate may comprise a multi-layered formation including a magnetic shield layer 110 and an insulating substrate layer 111. The magnetic shield layer 110 serves as a bottom shield, protecting the pole from magnetic interference. The layer 110 may comprise a layer of NiFe or another magnetic material. The insulating substrate layer 111 provides a substrate for the deposition of the magnetic shield layer 110 and the other material layers. In some embodiments, the layer 111 may comprise alumina or another nonmagnetic substrate material.

The layer 108 provides a layer for damascene material removal, such as RIE, to provide a trench 105 for the magnetic pole. In some embodiments, the layer 108 comprises, such as alumina. However, any suitable material capable of being etched trapezoidal shape may be employed.

Additionally, in some embodiments, a hard mask layer 106 for the RIE trench formation is provided on the layer 108. In some embodiments, the layer 106 also acts as a CMP stop layer. In some embodiments, the layer 106 may comprise a layer of TaRu, however other materials may be used. The trench 105 may be formed in any conventional manner—for example, using an etching process such as reactive-ion etching (RIE) using the layer 106 as a mask.

Next, in step 204, a first seed layer 112 is deposited on the bottom 109 and sides 107 of the trench 105. The assembly after deposition of the first seed layer 112 is illustrated in FIG. 1B. The first seed layer 112 is deposited using an ion beam deposition (IBD) process. In the IBD process, the beam deposition angle may be modified. Here, the modification of the beam deposition angle modifies the ratio of the bottom thickness 113 to the side thickness 114. A beam deposition angle of 90° (or normal to the bottom 109) results in the largest bottom thickness 113 and minimum side thickness 114, while lower deposition angles reduce the bottom thickness 113 and increase the side thickness 114. Accordingly, the ratio of the bottom thickness 113 to the side thickness 114 may be chosen by selecting a particular IBD deposition angle. The particular IBD deposition angle for a particular application will typically be determined through experimentation. In some embodiments, the angle may be between 23° and 53°—for example, 43°.

The first seed layer 112 may comprise a variety of materials. In some embodiments, the first seed layer 112 comprises tantalum, titanium, aluminum, chromium, ruthenium, rhodium, palladium, silver, osmium, iridium, platinum, or gold. In particular embodiments, the first seed layer 112 is a bilayer, comprising a first, binding or glue material and a second, seed material. In various embodiments, the first layer may comprise at least one of tantalum, titanium, aluminum, or chromium. Additionally, the first layer may have varying thicknesses—for example, between 1.5 and 2.5 nm. In a particular embodiment, the first layer of the bilayer is composed of between 1.5 and 2.5 nm of tantalum. The second, seed layer of the bilayer comprises a seed for the next layer in the stack. In some embodiments, this layer may comprise at least one of ruthenium, rhodium, palladium, silver, osmium, iridium, platinum, or gold. Likewise, the second seed layer may have varying thicknesses—for example, between 15 and 30 nm. In a particular embodiment, the second, seed layer of the bilayer 112 comprises a layer of between 15 and 30 nm ruthenium.

In some embodiments, the thickness of the first, glue layer is constant and the selection of the thickness for the second, seed layer, is used for the tunability of the process. For example, the process step 204 may comprise IBD depositing a relatively uniform layer of the first, glue layer. After this, step 204 may further comprise selecting a bottom thickness 113 to side thickness 114 ratio for the seed layer of layer 113 by setting the IBD deposition angle. Then, a desired bottom thickness 113 may be achieved by depositing a predetermined amount of the seed material.

In step 205, a second layer 115 is deposited on the first seed layer 113 using a PVD process. The assembly after deposition of the second layer 115 is illustrated in FIG. 1C. The second layer 115 provides a seed layer for the non-magnetic gap layer 117 (see, FIG. 1D). The PVD process for the second seed layer 115 may be performed substantially in accordance with conventional methods. In some embodiments, the PVD process provides good step coverage for the trench 105, facilitating the deposition of the non-magnetic gap layer 117. In some embodiments, step 205 may be omitted, and the non-magnetic gap layer 117 may be deposited directly on the first seed layer 112.

The second seed layer 115 may also have a bilayer structure. In some embodiments, the second seed layer 115 has a similar elemental composition as the first layer 112. For example, the second seed layer 115 may comprise tantalum, titanium, aluminum, chromium, ruthenium, rhodium, palladium, silver, osmium, iridium, platinum, or gold. In particular, the second seed layer 115 may have a first layer of a bilayer comprising a first, binding or glue material and a second, seed material. In various embodiments, the first layer of bilayer 115 may comprise at least one of tantalum, titanium, aluminum, or chromium. Additionally, the first layer may have varying thicknesses—for example, between 1:5 and 2.5 nm. In a particular embodiment, the first layer of the bilayer is composed of between 1.5 and 2.5 nm of tantalum. The second, seed layer of the bilayer 115 comprises a seed for the next layer 117 in the stack. In some embodiments, the second layer of bilayer 115 may comprise a noble metal, and in particular at least one of ruthenium, rhodium, palladium, silver, osmium, iridium, platinum, or gold. In a particular embodiment, the second layer of the bilayer 115 comprises between 5 to 7.5 nm of ruthenium. However, the thickness of the second layer may be increased in some embodiments without impacting device performance. For example, the layer may be increased to about 15 nm in some embodiments.

In other embodiments, the second layer 115 does not have a bilayer structure. For example, in one embodiment, the tantalum, titanium, aluminum, or chromium is omitted, and the layer 115 comprises only noble metals, such as ruthenium, rhodium, palladium, silver, osmium, iridium, platinum, or gold. In particular, the second layer 115 may consist of ruthenium only.

As understood in the art, in between the steps of the described process, the layers may be prepared for the next layer through cleaning or other preparation processes. For example, a pre-sputter etch may be used after deposition of each seed layer and after deposition of the non-magnetic layer. These preparation processes generally remove some material from the layers they are preparing. Accordingly, the amount of the noble metal used in the layer 115 is such that a sufficient layer of the metal remains after surface preparation. For example, 7.5 nm Ru may be used so that after removal of 2.5 nm of material during pre-sputter etching, a sufficient layer of Ru remains to prevent oxidation of the precursors.

The PVD process 205 may provide a generally conformal coating, with good step coverage. Accordingly, the thickness 116 of the bilayer 115 may be substantially constant throughout the entire bilayer. In some embodiments, the bilayer 115 has an amorphous or fine-grained structure. Such an amorphous or fine-grained structure may provide a beneficial surface for the growth mechanism of the non-magnetic gap layer 117. In particular embodiments, the PVD seed layer 115 has an amorphous structure or grain sizes below 5 nm. The grain structure may be controlled by varying the pressure of the precursor vapor used during the PVD process 205. Accordingly, in the particular embodiments, the pressure in the PVD chamber is sufficient to produce an amorphous structure or grain sizes below 5 nm in the PVD layer 115.

In step 206, the non-magnetic gap layer 117 is deposited using a chemical vapor deposition (CVD) process. The assembly after step 206 is illustrated in FIG. 1D. This deposition may be performed in substantially the same manner currently performed in the art. As understood in the art, the general desired thickness of the total assembly is dictated by the general process size. For example, for a process providing a 65-70 nm sidegap, the CVD layer may have a thickness between 60-70 n. For a process providing a 60 nm sidegap, the thickness of the CVD layer 117 is desired to be between 50-60 nm. The non-magnetic gap layer 117 may comprise any material having sufficient conductivity and capable of serving as a seed layer for the upper magnetic materials. In some embodiments, Ru serves as a suitable material for the gap layer 117.

Even though the initial CVD application may be conformal, after surface preparation for the deposition of the remainder of the writer pole, the bottom gap thickness 120 of the layer will be less than the side gap thickness 121 of the layer. However, because of the presence of the first seed layer 112, the total bottom gap thickness 118 of the assembly may be as thick as or thicker than the total side gap thickness 119. In general, the tunability of the first layer's 112 bottom thickness 113 to side thickness 114 ratio allows selection of the entire assembly's bottom gap thickness 118 to side gap thickness 119 ratio. In some embodiments, the total BG/SG ratio may be tunable from 90% to 120% depending on the selected ratio for the layer 112. In further embodiments, the BG/SG ratio is between 100% and 120%. In a particular embodiment, the BG/SG ratio is 105%. In some embodiments, the increase in the bottom gap thickness reduces flux leakage, thereby increasing writeability of the writer poles. Additionally, because the BG/SG ratio is tunable, the technique can be extended to future generations of writer design.

As discussed above, the non-magnetic gap layer 117 serves as a seed layer for the magnetic materials of the writer pole 123. As understood in the art, the pole may further comprise a hard magnetic material 122. Additionally, the hard magnetic material 122 may be encapsulated with a soft magnetic material 124. Accordingly, in various embodiments, in step 207, a soft magnetic layer 124 may be deposited on the non-magnetic gap layer 117 after surface preparation. Afterwards, the trench 105 may be filled 208 with a hard magnetic material 122. These processes may be performed in any manner known in the art.

Figure 3:
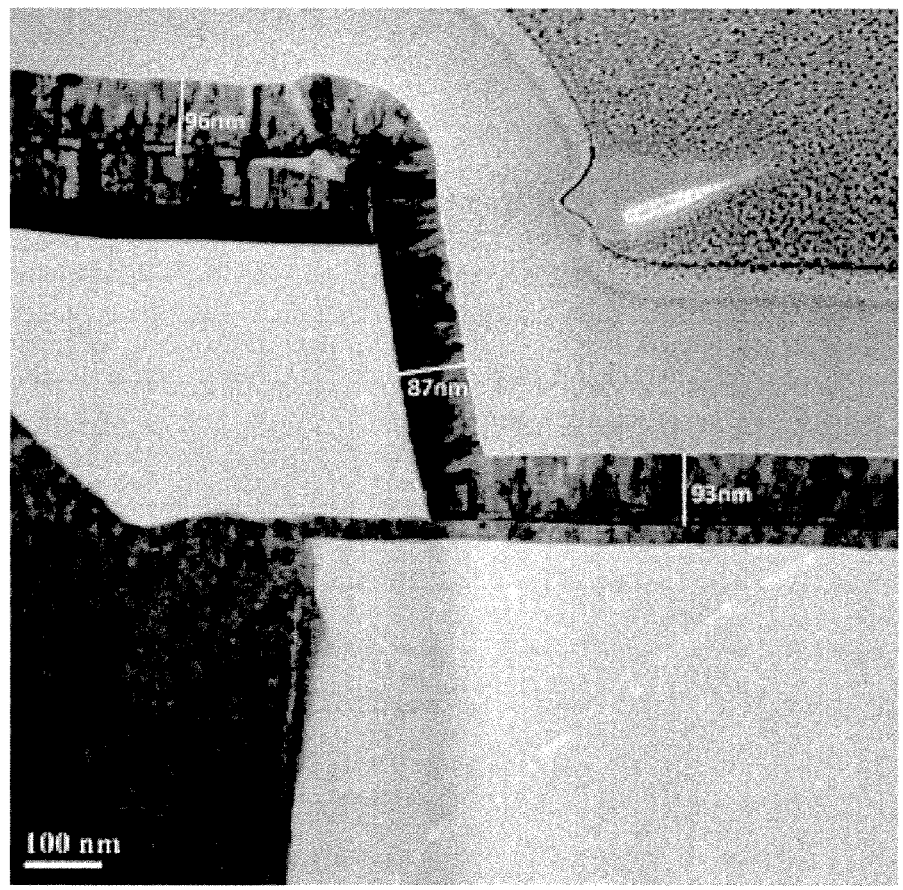
FIG. 3 illustrates a specific example implemented in accordance with an embodiment of the invention.

FIG. 3 illustrates a specific example implemented in accordance with an embodiment of the invention. In this example, a Ru non-magnetic gap layer was deposited using a CVD process on PVD TaRu and IBD TaRu seed layers. Over a 105% bottom gap/side gap ratio was achieved. Additionally, the surface exhibited an extremely smooth profile.

In the foregoing specification, embodiments of the invention have been described with reference to specific exemplary features thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A method, comprising:
    ion beam depositing a seed layer over the bottom and sides of a trench formed in an insulating material over a substrate,
    the ion beam depositing using a predetermined ion beam deposition angle such that the seed layer has a different thickness over the bottom of the trench than over the sides of the trench;
    chemical vapor depositing a non-magnetic gap layer over the seed layer; and
    physical vapor depositing a second seed layer on the first seed layer;
    wherein the non-magnetic gap layer is deposited on the second seed layer.

2. The method of claim 1, wherein the physical vapor deposition of the second seed layer is performed at a sufficient pressure such that the second seed layer is amorphous or has grain sizes below 5 nm.

3. The method of claim 1, wherein the second seed layer comprises at least one of tantalum, titanium, aluminum, or chromium and at least one of ruthenium, rhodium, palladium, silver, osmium, iridium, platinum, or gold.

4. The method of claim 1, wherein the second seed layer comprises an application of between 1.5 and 2.5 nm of tantalum and between 5 and 7.5 nm of ruthenium.

5. The method of claim 1, wherein the seed layer comprises at least one of tantalum, titanium, chromium, or aluminum and at least one of ruthenium, rhodium, palladium, silver, osmium, iridium, platinum, or gold.

6. The method of claim 1, wherein the seed layer comprises an application of between 1.5 and 2.5 nm of tantalum and between 15 and 30 nm of ruthenium.

7. The method of claim 1, wherein the non-magnetic gap layer comprises ruthenium.

8. The method of claim 1, further comprising depositing a soft magnetic shield layer on the non-magnetic gap layer.

9. The method of claim 8, wherein the soft magnetic shield layer comprises a nickel-iron, nickel-iron-cobalt, iron-cobalt based soft magnetic material.

10. A method, comprising:
    ion beam depositing a seed layer over the bottom and sides of a trench formed in an insulating material over a substrate,
    the ion beam depositing using a predetermined ion beam deposition angle such that the seed layer has a different thickness over the bottom of the trench than over the sides of the trench; and
    chemical vapor depositing a non-magnetic gap layer over the seed layer;
    wherein the predetermined ion beam deposition angle is configured to provide a predetermined ratio of bottom gap thickness to side gap thickness.

11. The method of claim 10, wherein the predetermined ion beam deposition angle is between 23° and 53°.

12. A perpendicular magnetic recording writer main pole created by a process, the process comprising:
    ion beam depositing a first seed layer over the bottom and sides of a trench formed in an insulating material over a substrate,
    the ion beam depositing using a predetermined ion beam deposition angle such that the seed layer has a different thickness over the bottom of the trench than over the sides of the trench;
    physical vapor depositing a second seed layer on the first seed layer; and
    chemical vapor depositing a non-magnetic gap layer on the second seed layer.

13. The perpendicular magnetic recording writer main pole of claim 12, wherein:
    the first seed layer comprises an application of between 1.5 and 2.5 nm of tantalum and between 15 and 30 nm of ruthenium;
    wherein the second seed layer comprises an application of between 1.5 and 2.5 nm of tantalum and between 5 and 7.5 nm of ruthenium; and
    the non-magnetic gap layer comprises ruthenium.

* * * * *